May 10, 1949.  E. H. YONKERS  2,469,940
INDICATING, CONTROLLING, AND RECORDING INSTRUMENT
Filed Oct. 16, 1944  2 Sheets-Sheet 1
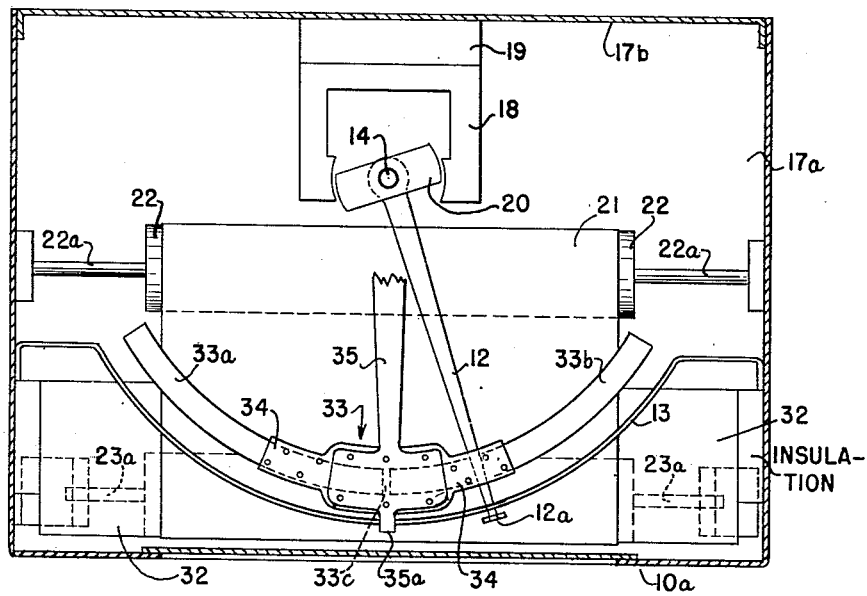
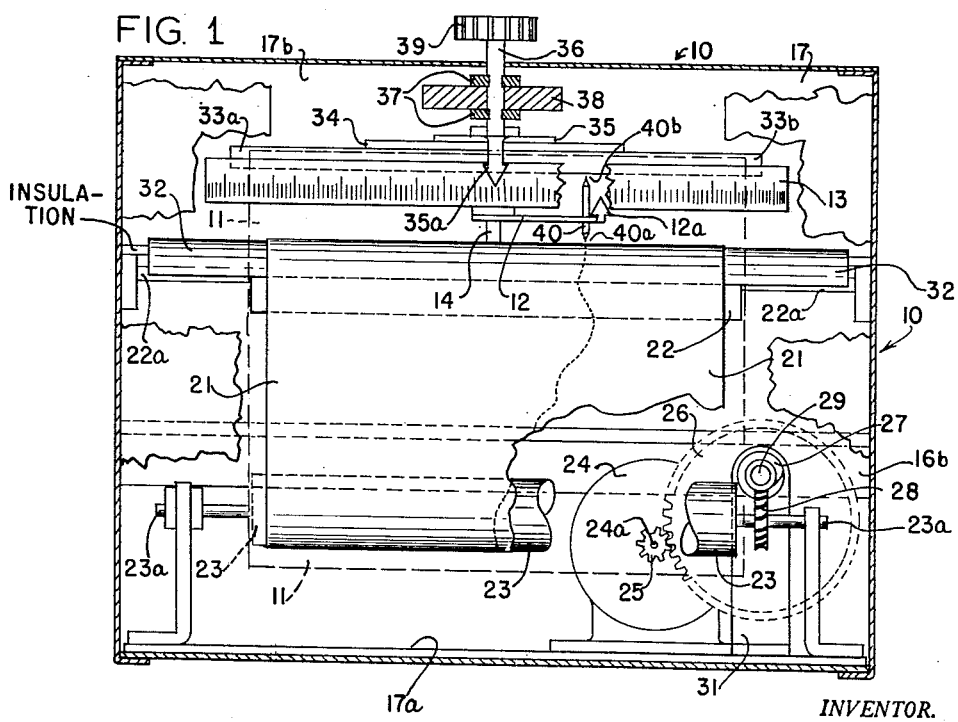
INVENTOR.
EDWARD H. YONKERS
BY Mueller, Dodds & Mason
ATTORNEYS May 10, 1949.　　　　　E. H. YONKERS　　　　　2,469,940
INDICATING, CONTROLLING, AND RECORDING INSTRUMENT
Filed Oct. 16, 1944　　　　　　　　　　　　　2 Sheets-Sheet 2
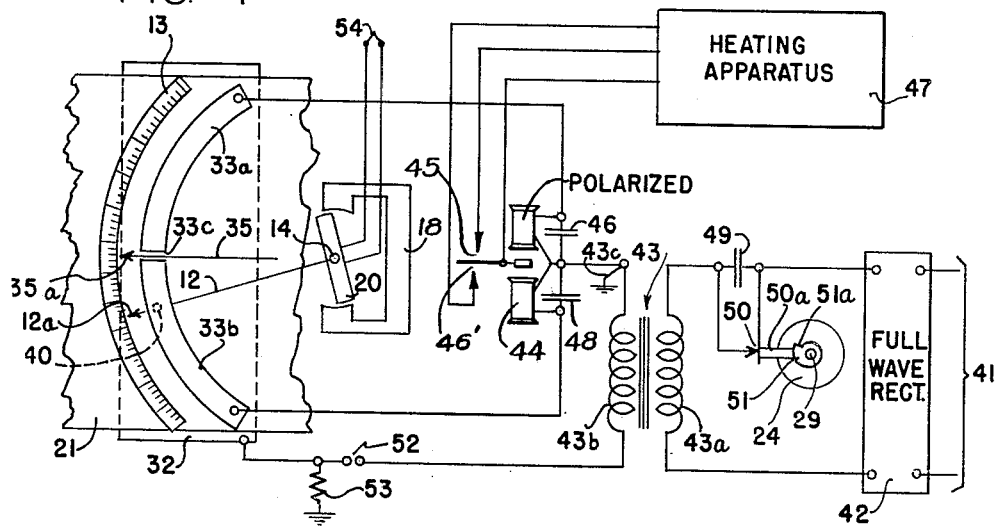
INVENTOR.
EDWARD H. YONKERS
ATTORNEYS Patented May 10, 1949

2,469,940

UNITED STATES PATENT OFFICE 2,469,940

INDICATING, CONTROLLING, AND RECORDING INSTRUMENT

Edward H. Yonkers, Chicago, Ill.

Application October 16, 1944, Serial No. 558,939

6 Claims. (Cl. 346—74)

The present invention relates to indicating apparatus and more particularly to improvements in electrical measuring instruments of the character including facilities for concurrently indicating and recording the magnitude of a variable quantity upon a record strip.

In many applications for measuring instruments of the type mentioned it is desirable to utilize movement of the indicating element in the performance of different control operations on a selective basis as the indicating element is moved to different segments of its indicating range. To render such an instrument readily adaptable to a wide range of uses it is also desirable that the record strip be movable at any selected speed within a wide speed range. Conventional stylus recording is wholly undesirable in an instrument of this type for the reason that the sensitivity of the instrument is ruined by the frictional drag imposed upon the movable indicating element. In fact, to preserve maximum sensitivity and accuracy of the instrument in the performance of its indicating functions it is desirable that the indicating element be entirely free of mechanical connections other than those required for supporting the element.

It is an object of the present invention, therefore, to provide an improved instrument of the character described which may include facilities for either control or recording purposes, or both, and wherein the sensitivity and accuracy of the indicating function is in no way impaired by the other functions assigned to the instrument.

It is another and more specific object of the invention to provide an instrument of the character described wherein any two or all three of the described functions of indicating, recording and controlling may be performed under the control of the movable element of the instrument without the use of any mechanical connections to the movable element.

According to another object of the invention, the recording operation is effected by utilizing the movable element of the instrument to direct a series of periodically generated electrical discharges through a record strip which may be constantly driven at any one of a number of speeds within a wide speed range.

In accordance with a further object of the invention, the generation of the electrical discharges is synchronized with the movement of the recording strip so that regardless of the speed of the strip, the same discharge point spacing is maintained during operation of the instrument.

According to still another object of the invention, the energy developed in producing the described electrical discharges is also utilized in effecting the desired control operations.

In accordance with yet another object of the invention, desired selective control operations are obtained by utilizing the movable element of the instrument selectively to direct the electrical discharges to different electrodes of an adjustable multi-element electrode system.

It is another and more specific object of the invention to so generate the electrical dscharges and distribute the same to the described electrode system as to prevent interference with the indicating function of the instrument.

The invention, both as to its organization and method of operation, together with further objects and advantages thereof, will best be understood by reference to the following specification taken in connection with the accompanying drawings, in which:

Fig. 1 is a front view, partially in section, illustrating improved apparatus characterized by the features of the present invention;

Fig. 2 is a top view of the apparatus shown in Fig. 1;

Fig. 3 is an end view, partially in section, of the apparatus; and

Fig. 4 diagrammatically illustrates the circuit arrangement of the apparatus.

Referring now to the drawings, and more particularly to Figs. 1, 2 and 3 thereof, the present improved indicating, control and recording apparatus is there illustrated as comprising the usual instrument housing 10 within which the working parts of the apparatus are enclosed. In brief, the apparatus comprises the usual movable indicating element 12 supported by an actuating pin 14 and having a pointer 12a at its indicating end which is arranged to cooperate with the indicia of an arcuate scale 13. The pivot pin 14 is supported between a pair of brackets 16a and 16b carried by the back wall 17b of a chassis member 17. More specifically, these bracket pieces are respectively provided with jeweled bearings 15a and 15b having conical bearing surfaces within which the conical ends of the pivot pin 14 are received. At its lower end the pivot pin 14 carries a moving coil 20 which is arranged to cooperate with a permanent field magnet 18 in rotating the pin 14 to actuate the movable indicating element 12. As explained more in detail hereinafter, the moving coil 20 may be energized by a current which varies in magnitude in accordance with any variable quantity which is desired to measure. Thus, if the apparatus is to be used to control heating apparatus for generating heat within a given space and concurrently therewith to indicate and record variations in the temperature within the heated space or the combustion zone of the apparatus, the moving coil 20 may be energized by the voltage developed by a thermocouple 54 disposed at a strategic point within the space to which heat is delivered or within the combustion zone, as the case may be.

The recording mechanism of the apparatus comprises a movable record strip 21 which is fed from a take-off reel 22 over a combined guide member and electrode 32 to a wind-up reel 23. The electrode 32 and the shafts 22a and 23a upon which the reels 22 and 23 are respectively mounted may be supported in the positions illustrated in Fig. 3 of the drawings by means of suitable supporting brackets carried either by the bottom wall 17a or the back wall 17d of the chassis member 17. In this regard, it is noted that the supporting assembly for the electrode 32 includes facilities for insulating this electrode from the other parts of the structure and that the electrode is comprised of a suitable conductive metal. For the purpose of driving the wind-up reel 23, thereby to feed the record strip 21 from the take-off reel 22 over the electrode 32, the wind-up reel 23 is arranged to be driven by a synchronous or constant speed electric motor 24 through a driving connection which includes the gear 25 and 26, a shaft 29, a worm 27 and a worm gear 28 carried by the shaft 23a upon which the wind-up reel 23 is supported. As best shown in Fig. 3 of the drawings, the shaft 29 is rotatably supported by means of two bearing brackets 30 and 31 respectively mounted upon the bracket 16b and the bottom wall 17a of the chassis member 17. Adjustment in the speed of movement of the strip 21 may be obtained by utilizing different pairs of gears having different tooth ratios to provide the required driving connection between the rotor shaft 24a of the motor 24 and the shaft 29.

In order to produce upon the record strip 21 a record of variations in the position of the movable indicating element 12 relative to the scale 13, facilities including an adjustable electrode system indicated generally at 33, and a movable electrode 40 carried by the indicating element 12, are provided for periodically producing electrical discharges through the record strip 21. In the illustrated arrangement, the electrode system 33 comprises two curved electrodes arranged in end to end relationship above the common electrode 32. These two electrodes are carried by an arm 35 which is fixedly mounted upon a rotatably adjustable shaft 36 journaled in a bearing bracket 38 carried by the back wall 17b of the chassis member 17. This shaft is axially aligned with the pivot pin 14 upon which the movable indicating element 12 is supported, and C-washers 37 disposed upon opposite sides of the bearing bracket 38 and seated within grooves formed at the peripheral surface of the shaft 36 are utilized to restrain this shaft against axial movement. The upper end of the shaft 36 projects through a slot or hole in the upper wall of the housing 10 and carries a knob 39 which may be rotated by finger manipulation to change the angular setting of the arm 35 and the electrode system 33 carried thereby. As best shown in Fig. 2 of the drawings, the adjacent ends of the two electrodes 33a and 33b are out of engagement. These two electrodes are insulatingly mounted upon the arm 35 by means of an insulating plate 34 disposed between the arm and the electrodes and rivet or pin connected to all three of the identified parts. With this arrangement, the separating point 33c between the adjacent ends of the two electrodes 33a and 33b may be adjusted at will over at least a limited range of the scale 13 by appropriate finger manipulation of the knob 39 to rotate the shaft 36. For the purpose of indicating the setting of this electrode separating point relative to the scale 13 in terms of the scale graduations, the arm 35 is provided with an indicating pointer 35a which overlies the upper margin of the scale 13 to index with the indicia inscribed upon the front surface of the scale. In this regard, it is noted that the housing 10 is provided with a viewing window in the front wall 10a thereof through which the scale 13, the pointers 12a and 35a, and that portion of the record strip 21 traveling between the common electrode 32 and the wind-up reel 23 are clearly visible. This window is preferably covered by a transparent member 11 having the function of excluding dust from the working parts of the apparatus without obstructing a view of the indicating and recording elements.

As will be apparent from the above explanation, the arrangement of the three electrodes 32, 33a and 33b, is such that the movable electrode 40 carried by the arm 12 floats free and is entirely out of contact with the three identified stationary electrodes. In order to produce periodic electrical discharges between the common electrode 32, the movable electrode 40 and the one of the two electrodes 33a and 33b beneath which the movable electrode 40 may be positioned, the impulse generating facilities illustrated in Fig. 4 of the drawings may be used. In brief, these facilities comprise a full wave rectifier 42 which may be energized from an available alternating current source indicated by the bracketed terminals 41; an induction coil 43 having a high turn ratio between the primary winding 43a and the secondary 43b thereof; a pair of interrupter contacts 50 shunted by a condenser 49; and an interrupting cam 51 mounted for rotation with the drive shaft 29 and arranged periodically to open and close the interrupting contacts 50 through a cam follower button 50a formed of insulating material. In order to produce an exceedingly fast voltage pulse across the secondary winding 43b of the induction coil 43 when the contact points 50 are opened these contacts are preferably formed of graphite. Further to this end, the illustrated drop-off point 51a of the interrupter cam 51 is preferably cut back in a manner such that when it clears the follower button 50a, this button, the movable contact of the contact set 50 and the spring arm upon which this contact is carried, are entirely free to move away from the stationary contact of the contact set 50 and thus produce an exceedingly rapid break in the circuit normally completed between the output side of the rectifier 42 and the primary winding 43a of the transformer 43. With this arrangement and as explained more fully below, exceedingly short impulse voltages are produced across the induction coil secondary winding 43b at a rate which is determined by the speed of operation of the motor 24.

For the purpose of impressing the described voltage impulses between the common electrode 32, on the one hand, and the two electrodes 33a and 33b on the other hand, and of utilizing the resulting electrical discharges between the electrodes to effect the desired control operations, the lower terminal of the winding 43b is connected to the common electrode 32 over a path which includes a small isolating gap 52; and the upper terminal of the winding 43b is coupled to both of the electrodes 33a and 33b over paths which respectively include the two condensers 46 and 48. The desired control operations are effected through selective operation of a polarized relay 44, having windings respectively shunting the two condensers 46 and 48. This relay is a double-wound two-position relay having the characteristic that when one of its windings is energized, its armature is operated to one position. If now the one winding is deenergized, the armature remains in the position to which it is operated. If thereafter the same winding is energized, the armature is not operated. However, if the other winding is energized, the armature is operated to its other position where it remains regardless of continued energization or deenergization of the other winding. This relay is of the permanent magnet type, the field structure being so arranged that when the lower of its two windings, for example, is energized, the contacts 45 are closed and remain closed until the other winding of the relay is energized; and when the upper winding is energized, the contacts 45 are opened and the contacts 46' are closed, the latter contacts remaining closed in the absence of continued energization of the upper winding until such time as the lower winding of the relay is again energized. In order to maintain all parts of the electrode system at the same potential during the periods separating the voltage pulses, the two electrodes 33a and 33b are effectively connected to ground through the windings of the relay 44 by grounding the upper terminal of the inductance coil windings 43b as indicated at 43c. The common electrode 32 is similarly maintained at ground potential during the off pulse periods by connecting this electrode to ground through a resistor 53 of very high resistance and by providing the isolating gap 52 in the path connecting the electrode 32 with the lower terminal of the winding 43b.

The described apparatus is particularly well suited for controlling the operation of heating apparatus and for concurrently indicating and producing a time-temperature record of the temperature prevailing within the space to which heat is supplied by the heating apparatus. Accordingly, the moving coil 20 is illustrated in Fig. 4 of the drawings as being connected for energization by the voltage developed at the terminals of a hot junction thermocouple 54 disposed within a space which is to be heated by the heating apparatus schematically illustrated at 47. This apparatus is arranged for on and off control by the relay 44, the ararngement of the control equipment provided therein being such that when the contacts 46' are closed the apparatus is in operation, and when the contacts 45 are closed, operation of the apparatus is arrested.

In considering the operation of the instrument, it may be assumed that it is to be used to control the operation of the heating apparatus 47 and to indicate and record the temperature within the zone heated by this apparatus. Variations in this temperature are indicated by variations in the voltage developed at the terminals of the thermocouple 54. The thermocouple terminal voltage influences the setting of the moving coil 20 in an entirely conventional manner, such that the movable indicating element 12 coacts with the scale 13 to provide an indication of the temperature within the zone heated by the apparatus 47. Variations in the voltage impressed across the terminals of the moving coil 20 obviously result in a change in the setting of the indicating element 12 to produce a corresponding change in the pointer indication along the scale 13. Thus as the temperature within the space heated by the heating apparatus 47 changes, the movable electrode 40 is moved to different positions relative to the stationary electrodes 32, 33a and 33b.

With the motor 24 energized, the record strip 21 is continuously fed from the take-off reel 22 to the wind-up reel 23 through the driving connection afforded by the elements 25, 26, 29, 27 and 28 at a speed determined by the gear ratio between the two gears 25 and 26. Further, with the full wave rectifier 22 energized from a suitable alternating current source, exceedingly short voltage pulses of a high order of magnitude are periodically developed across the secondary winding 43b of the induction coil 43. Thus with the motor 24 and shaft 29 in operation, the contacts 50 are periodically opened and closed, at a rate which is synchronized with the speed of movement of the record strip 21, through the action of the interrupter cam 51 coacting with the cam follower button 50a. Thus each time the cam drop-off point 51a clears the button 50a, the contacts 50 are instantly opened, permitting the current through the primary winding 43a to quickly fall to zero. The resulting rapid decrease in the flux linking the secondary winding 43b causes an induced voltage of high value to be instantly produced across the terminals of this winding. Since the flux is very rapidly reduced to zero each time the contacts 50 are opened, the voltage pulse is of exceedingly short duration. Thus it will be understood that high voltage pulses are periodically developed across the secondary winding 43b during continuous operation of the motor 24 to drive the record strip 21.

These voltage pulses are utilized to produce the electrical discharges between the moving electrode 40 and the common electrode 32 which result in an intermittent record line being produced along the record strip 21. Thus, assuming that the movable indicating element 12 occupies a setting such that the movable electrode 40 is disposed between the common electrode 32 and the upper electrode 33a, indicating that the temperature within the zone heated by the heating apparatus 47 is low, electrical discharges are produced between the three electrodes 33a, 40 and 32 each time a voltage pulse is developed across the terminals of the secondary winding 43b. Specifically, each voltage pulse is impressed across the two discharge paths 40a and 40b in series over a circuit which includes the condenser 46 and the isolating gap 52. Since the rate of voltage rise of each voltage pulse is very steep, only a very small fraction of the available voltage appears across the condenser 46 and the shunt connected upper winding of the relay 44, the major portion of the voltage being applied directly to the three series connected discharge paths 40a, 40b and 52. The magnitude of the voltage is sufficient to cause all three of these paths to spark over. In this regard, it is noted that the ohmic value of the resistor 53 is high as compared with the impedance of the circuit including the three series connected discharge paths after sparkover has been accomplished by the impulse voltage, so that the major portion of the impulse current flows through the relay winding.

Each time the gap 40a through the record strip 21 is broken down to produce an electrical discharge between the electrodes 32 and 40, a point puncture of the record strip 21 occurs. In order to render this puncture point visible without magnification, the inner surface of the record strip, i. e., the surface adjacent the electrode 32 is preferably coated with a fusible material carrying a strong contrasting color. As a result, the fusible material adjacent each puncture point is melted and flows through the puncture to produce a clearly visible indication at the surface of the record strip. Since the record strip 21 is continuously moving and the electrical discharges between the two electrodes 40 and 32 are periodically produced, it will be understood that a line of puncture points is formed along the record strip intermediate the edges thereof. Moreover, since the electrode 40 is moved by the indicating element 12 back and forth across the face of the record strip in response to changes in the temperature within the zone heated by the heating apparatus 47, an intermittent time-temperature curve is produced by the puncture points along the length of the record strip.

As indicated above, initially a very small part of each voltage pulse appears across the condenser 46. When the discharge paths 40a, 40b and 52 are broken down, however, the series impedance of the paths becomes small relative to the impedance of the condenser 46, permitting this condenser to be charged to a voltage in excess of that required to produce operation of the relay 44 from one of its settings to the other. After the voltage pulse terminates, the condenser 46 discharges through the upper winding of the relay 44. Assuming first that the relay 44 occupies its heat cut-off setting, i. e., a setting wherein the contacts 45 are closed, at the time a given voltage pulse occurs, the discharge current from the condenser 46 through the upper winding of the relay 44 causes this relay to operate to the reverse or heat-on setting wherein the contacts 46 are closed and the contacts 45 are opened. Thus operation of the heating apparatus 47 is initiated. Thereafter and during further charging and discharging of the condenser 46 the periodic energization of the upper winding of the relay 44 is without effect to change the setting of this relay. As the temperature within the combustion zone of the heating apparatus 47 rises, however, the movable indicating element 12 gradually swings across the scale 13 from its low temperature setting toward a high temperature setting and in so doing carries the movable electrode 40 from a position beneath the upper electrode 33a to a position beneath the upper electrode 33b. Immediately this occurs, the electrical discharges occur between the electrodes 33b, 40 and 32 rather than between the electrodes 33a, 40 and 32. The voltage pulses are now impressed across the identified electrodes over a path which includes the condenser 48 rather than the condenser 46. Accordingly the condenser 48 is charged during each voltage pulse period and discharges through the lower winding of the relay 44 after each voltage pulse is terminated. When the lower winding of the relay 44 is thus energized, this relay operates to open its contacts 46 and close its contacts 45, thereby to arrest the operation of the heating apparatus 47. Thus as the movable indicating element 12 is moved back and forth beneath the two electrodes 33a and 33b the relay 44 is controlled alternately to start and stop operation of the heating apparatus 47.

As indicated above the isolating gap 52, the grounding resistor 53 and the ground connection 43c are provided to prevent differences of potential from being developed between the electrodes of the electrode system during off-pulse periods. In this regard, it will be noted that each time the interrupter cam 51 recloses the contacts 50 after a voltage pulse period, the resulting current build-up in the primary winding 43a of the induction coil 43 causes an induced voltage of slowly increasing and then decreasing magnitude to be developed across the terminals of the secondary winding 43b. This voltage is manifested as a voltage drop across the isolating gap 52, which gap has a relatively high impedance as compared with the resistance of the resistor 53 at the designated low rate of change of the voltage across the winding 43b. The common electrode 32 thus remains substantially at ground potential, and the two upper electrodes 33a and 33b are held at ground potential by the connection 43c, whereby substantially no potential difference is developed between the electrodes 32 and 33.

From the foregoing explanation, it will be understood that the separating point 33c between the two electrodes 33a and 33b constitutes the point beyond which the movable indicating element 12 cannot be moved in either direction without changing the setting of the polarized relay 44. Thus this electrode separation point constitutes a temperature index, or more properly is indicative of the temperature which it is desired to hold within the zone heated by the heating apparatus 47. More generally considered, after a heating operation is well under way, the movable indicating element 12 will fluctuate back and forth beneath the two electrodes 33a and 33b over relatively small increments of the temperature scale to produce corresponding changes in the setting of the relay 44. In order to provide for different operating temperatures within the zone heated by the heating apparatus 47, the two electrodes 33a and 33b are adjustably supported relative to the scale 13 and the common electrode 32 to provide for adjustment of the electrode separating point 33b over any desired range of the scale 13. Thus by appropriate finger manipulation of the knob 39, the arm 35 may be rotated to locate the electrode separating point 33b at any desired point along the scale 13, this point being indicated by the indexed relationship between the scale 13 and the pointer 35a. It will be apparent, therefore, that by appropriate adjustment of the knob 39 to change the setting of the electrode separating point 33c, the described control apparatus may be utilized to force the heating apparatus 47 to operate at any desired temperature.

From the foregoing explanation, it will be understood that the electrical discharges produced within the described electrode system serve to produce a record line along the length of the record strip 21 indicating changes in temperature as a function of time, and to effect selective operation of the control device 44. The desired time-temperature record is, moreover, produced without any frictional contact between the movable indicating element 12 and the recording surface. Also, by appropriately changing the gear ratio between the motor shaft 24a and the drive shaft 29, the speed of recording may be adjusted as desired. The record points as produced by the electrical discharge puncturing of the record strip 21 are, however, equally spaced along the length of the record strip 21 regardless of the speed at which this strip is moved. Thus, since the interrupting cam 51 is operated in synchronism with the wind-up reel 23, any change in the speed of the latter is accompanied by a corresponding change in the speed at which the voltage pulses are produced. Preferably, the relationship between the speed of movement of the record strip 21 and the speed of operation of the interrupter cam 51 is such that a spacing of approximately one-sixteenth of an inch is provided between successive puncture points along the record strip 21.

While there has been described what is at present considered to be the preferred embodiment of the invention, it will be understood that various modifications may be made therein which are within the true spirit and scope of the invention as defined in the appended claims.

I claim:

1. In a recording device comprising a pair of spaced electrodes, means for moving a record strip between said electrodes, means for moving one of said electrodes relative to the other electrode in accordance with a variable quantity to be recorded, means for impressing voltage pulses between said electrodes at spaced intervals and over different ones of a plurality of current paths, each of said voltage pulses being of sufficient magnitude to produce an electrical discharge between said electrodes, whereby a line of discharge points indicative of variations in the relative positions of said electrodes is produced on said record strip, and control means including circuit elements serially included in different ones of said paths, said control means being selectively responsive to the energization of different ones of said circuit elements as said pulses are impressed between said electrodes over different ones of said paths.

2. In a recording device comprising a pair of spaced electrodes, means for moving a record strip between said electrodes, means for moving one of said electrodes relative to the other electrode in accordance with a variable quantity to be recorded, a circuit for impressing voltage pulses between said electrodes at spaced intervals, each of said voltage pulses being of sufficient magnitude to produce an electrical discharge between said electrodes, whereby a line of discharge points indicative of variations in the relative positions of said electrodes is produced on said record strip, a winding serially included in said circuit, and a condenser shunting said winding, said condenser to be charged during each voltage pulse period and to discharge through said winding during each off-pulse period, and means responsive to the energization of said winding for operating a control circuit.

3. In a combination recording and control device comprising a pair of spaced electrodes, means for moving a record strip between said electrodes, a circuit for impressing voltage pulses between said electrodes at spaced intervals, a third electrode disposed between said spaced electrodes out of contact therewith, each of said voltage pulses being of sufficient magnitude to produce an electrical discharge between said spaced electrodes over a path which includes said third electrode at the point of disposition of said third electrode between said spaced electrodes, means for moving said third electrode and said spaced electrodes relative to each other in accordance with changes in a variable quantity to be recorded, whereby a line of discharge points indicative of variations in the relative positions of said third and spaced electrodes is produced on said record strip, a winding serially included in said circuit, and a condenser shunting said winding, said condenser to be charged during each voltage pulse period and to discharge through said winding during each off-pulse period, and means responsive to the energization of said winding for operating a control circuit.

4. In a combination recording and control device comprising a plurality of electrodes which are insulated from one another, a common electrode, a plural branch circuit for impressing voltage pulses at spaced intervals between said common electrode and said plurality of electrodes, means for moving a record strip between said common electrode and said plurality of electrodes, a movable electrode disposed between said common electrode and said plurality of electrodes out of contact therewith and movable across said plurality of electrodes, each of said voltage pulses being of sufficient magnitude to produce an electrical discharge between said common electrode and one of said plurality of electrodes at the point of disposition of said movable electrode between said common electrode and said plurality of electrodes, means for moving said movable electrode and the other electrodes relative to each other in accordance with changes in a variable quantity to be recorded, whereby a line of discharge points indicative of the relative positions of said movable electrode and the other electrodes is produced on said strip, and control means including windings selectively energized by said voltage pulses over branch circuits respectively including different ones of said plurality of electrodes.

5. A combination recording and control device comprising a plurality of electrodes which are insulated from one another, a common electrode, driving means for moving a record strip between said common electrode and said plurality of electrodes, a movable electrode disposed between said common electrode and said plurality of electrodes and movable across said plurality of electrodes, means for moving said movable electrode across said plurality of electrodes in accordance with changes in a variable quantity to be recorded, a plurality of circuit paths respectively including different ones of said plurality of electrodes, means for impressing a recording voltage upon said strip over the particular circuit path including the one of said plurality of electrodes across which said movable electrode is moving, whereby said circuit paths are selectively energized as said movable electrode is moved back and forth across said plurality of electrodes, and control means including circuit elements connected in different ones of said paths, said control means being selectively responsive to the energization of different ones of said circuit elements as said recording voltage is applied to said strip over different ones of said paths.

6. A combination recording and control device comprising a plurality of electrodes which are insulated from one another, a common electrode, driving means for moving a record strip between said common electrode and said plurality of electrodes, a movable electrode disposed between said common electrode and said plurality of electrodes and movable across said plurality of electrodes, means for moving said movable electrode across said plurality of electrodes in accordance with changes in a variable quantity to be recorded, a plurality of circuit paths respectively including different ones of said plurality of electrodes, means for impressing a recording voltage upon said strip over the particular circuit path including the one of said plurality of electrodes across which said movable electrode is moving, whereby said circuit paths are selectively energized as said movable electrode is moved back and forth across said plurality of electrodes, control means including circuit elements connected in different ones of said paths, said control means being selectively responsive to the energization of different ones of said circuit elements as said recording voltage is applied to said strip over different ones of said paths, and means for adjusting said plurality of electrodes relative to said movable electrode, thereby to provide for selective energization of said circuit elements at different positions of said movable electrode.

EDWARD H. YONKERS.

REFERENCES CITED

The following references are of record in the file of this patent:

UNITED STATES PATENTS

| Number | Name | Date |
|---|---|---|
| 605,548 | Jaeger | June 14, 1898 |
| 734,369 | Rodde | July 21, 1903 |
| 843,189 | Willis | Feb. 5, 1907 |
| 1,300,525 | Warren | Apr. 15, 1919 |
| 1,446,961 | Brown | Feb. 27, 1923 |
| 2,400,828 | Keinath | May 21, 1946 |

FOREIGN PATENTS

| Number | Country | Date |
|---|---|---|
| 133,976 | Germany | Sept. 24, 1902 |